US012031912B2

(12) United States Patent
Liu et al.

(10) Patent No.: US 12,031,912 B2
(45) Date of Patent: Jul. 9, 2024

(54) DEVICES AND METHODS FOR IMAGING MICROARRAY CHIPS

(71) Applicant: Duke University, Durham, NC (US)

(72) Inventors: Jason Liu, Durham, NC (US); Ashutosh Chilkoti, Durham, NC (US)

(73) Assignee: Duke University, Durham, NC (US)

( * ) Notice: Subject to any disclaimer, the term of this patent is extended or adjusted under 35 U.S.C. 154(b) by 308 days.

(21) Appl. No.: 17/607,761

(22) PCT Filed: May 2, 2020

(86) PCT No.: PCT/US2020/031210
§ 371 (c)(1),
(2) Date: Oct. 29, 2021

(87) PCT Pub. No.: WO2020/223713
PCT Pub. Date: Nov. 5, 2020

(65) Prior Publication Data

US 2022/0205917 A1 Jun. 30, 2022

Related U.S. Application Data

(60) Provisional application No. 62/841,983, filed on May 2, 2019.

(51) Int. Cl.
*G01N 21/64* (2006.01)

(52) U.S. Cl.
CPC ..... *G01N 21/6452* (2013.01); *G01N 21/6402* (2013.01); *G01N 21/6428* (2013.01);
(Continued)

(58) Field of Classification Search
CPC ........... G01N 21/6452; G01N 21/6402; G01N 21/6428; G01N 21/6456;
(Continued)

(56) References Cited

U.S. PATENT DOCUMENTS

| | | | |
|---|---|---|---|
| 2005/0019842 A1 | 1/2005 | Prober et al. | |
| 2006/0024756 A1 | 2/2006 | Tibbe et al. | |

(Continued)

FOREIGN PATENT DOCUMENTS

WO 2017015132 A1 1/2017

OTHER PUBLICATIONS

International Search Report and Written Opinion for Application No. PCT/US2020/31210 dated Jul. 29, 2020 (14 pages).

(Continued)

*Primary Examiner* — Georgia Y Epps
*Assistant Examiner* — Don J Williams
(74) *Attorney, Agent, or Firm* — Michael Best & Friedrich LLP

(57) ABSTRACT

A microarray chip imaging detector comprises a housing configured to receive a microarray chip. The detector includes a laser assembly supported by the housing and oriented at an angle relative to the microarray chip, the laser assembly configured to transmit an excitation beam along a first axis to samples on the microarray chip. The detector also includes a camera supported by the housing and positioned along a second axis, the camera configured to receive fluorescent light emitted from fluorophores in the samples on the microarray chip, the second axis oriented at an angle less than 30 degrees relative to the first axis. The housing includes a plurality of baffles positioned between the microarray chip and the camera, and a plurality of laser beamstops to receive the excitation beam reflected off the microarray chip.

16 Claims, 10 Drawing Sheets

(52) U.S. Cl.
CPC . *G01N 21/6456* (2013.01); *G01N 2021/6439* (2013.01); *G01N 2201/022* (2013.01); *G01N 2201/06113* (2013.01); *G01N 2201/0642* (2013.01)

(58) Field of Classification Search
CPC ..... G01N 2021/6439; G01N 2201/022; G01N 2201/06113; G01N 2201/064
See application file for complete search history.

(56) References Cited

U.S. PATENT DOCUMENTS

| | | | |
|---|---|---|---|
| 2007/0114362 | A1 | 5/2007 | Feng et al. |
| 2012/0071342 | A1 | 3/2012 | Lochhead et al. |
| 2013/0334407 | A1 | 12/2013 | Perrault, Jr. et al. |
| 2017/0236281 | A1 | 8/2017 | Dacosta |
| 2018/0217136 | A1 | 8/2018 | Chilkoti et al. |
| 2019/0285623 | A1 | 9/2019 | Chilkoti et al. |
| 2019/0391141 | A1 | 12/2019 | Chilkoti et al. |

OTHER PUBLICATIONS

Joh et al., "Inkjet-printed point-of-care immunoassay on a nanoscale polymer brush enables subpicomolar detection of analytes in blood," Proceedings of the National Academy of Sciences of the United States of America, 2017, 114(34): E7054-E7062.

DEVICES AND METHODS FOR IMAGING MICROARRAY CHIPS

CROSS-REFERENCE TO RELATED APPLICATIONS

This patent application is the U.S. national stage entry, under 35 U.S.C. § 371, of International Application Number PCT/US2020/031210, filed May 2, 2020, which is a non-provisional of and claims the benefit of U.S. Provisional Patent Application No. 62/841,983, filed on May 2, 2019, the entire contents of each of which are hereby incorporated by reference.

STATEMENT REGARDING FEDERALLY SPONSORED RESEARCH OR DEVELOPMENT

This invention was made with government support under UG3CA211232 awarded by the National Institutes of Health and W81XWH-17-2-0045 awarded by the Army Medical Research and Materiel Command (ARMY/MRMC). The government has certain rights in the invention.

BACKGROUND

Diagnostic assessment of protein biomarkers plays an essential role in modern medical practice, and its availability has a considerable impact on clinical evaluation and decision making in human health and disease.

Current microarray imaging detectors needed for fluorescent readout are bulky, expensive, slow, and not usable at the point of care (POC).

SUMMARY

The present disclosure provides a low-cost, 3D-printed, portable imaging detector that is operable to image a fluorescent microscope slide with protein microarrays printed on them with higher sensitivity than standard benchtop methods. The device according to the present disclosure can image fluorescent microarrays with high sensitivity in a handheld, battery-powered device. The device combines the latest advances in microscopy, mobile computing, and telemedicine through protein microarray imaging and analysis in one platform.

In one embodiment, the invention provides a microarray chip imaging detector comprising a first housing including a slot configured to receive a microarray chip, the first housing including a first pathway having a first axis, and a second pathway having a second axis. The detector also includes a second housing coupled to the first housing, the second housing includes a third pathway in optical communication with the first pathway of the first housing and aligned with the first axis, and a fourth pathway in optical communication with the second pathway of the first housing and aligned with the second axis, wherein the first axis is oriented at an acute angle relative to the second axis. The detector further includes a laser assembly received within a first receptacle in the first housing, the laser assembly configured to transmit a beam to the microarray chip through the first pathway and the third pathway, a lens received within a second receptacle in the second housing, the lens configured to receive and focus fluorescent light emitted from the microarray chip, a camera supported by the second housing and configured to detect the focused fluorescent light from the lens, and an optical filter positioned upstream of the lens. The second housing includes a plurality of baffles positioned between the microarray chip and the optical filter. The detector also includes a computer processor in electrical communication with the camera, the computer processor configured to receive data associated with the fluorescent light emitted from the fluorophores via the camera, generate a microarray image with the received data, automatically segment the microarray image with the received data, determine an average brightness of the data in at least one segment, calculate a concentration value based on the average brightness of the data in the segment, and transmit instructions to a display to present the concentration value of the segment.

In another embodiment the invention provides a microarray chip imaging detector comprising a housing configured to receive a microarray chip, a laser assembly supported by the housing and oriented at an angle relative to the microarray chip, the laser assembly configured to transmit an excitation beam along a first axis to samples on the microarray chip, a camera supported by the housing and positioned along a second axis, the camera configured to receive fluorescent light emitted from fluorophores in the samples on the microarray chip, the second axis oriented at an angle less than 30 degrees relative to the first axis, and the housing including a plurality of baffles positioned between the microarray chip and the camera, and a plurality of laser beamstops to receive the excitation beam reflected off the microarray chip.

Other aspects of the invention will become apparent by consideration of the detailed description and accompanying drawings.

DETAILED DESCRIPTION

Figure 1:
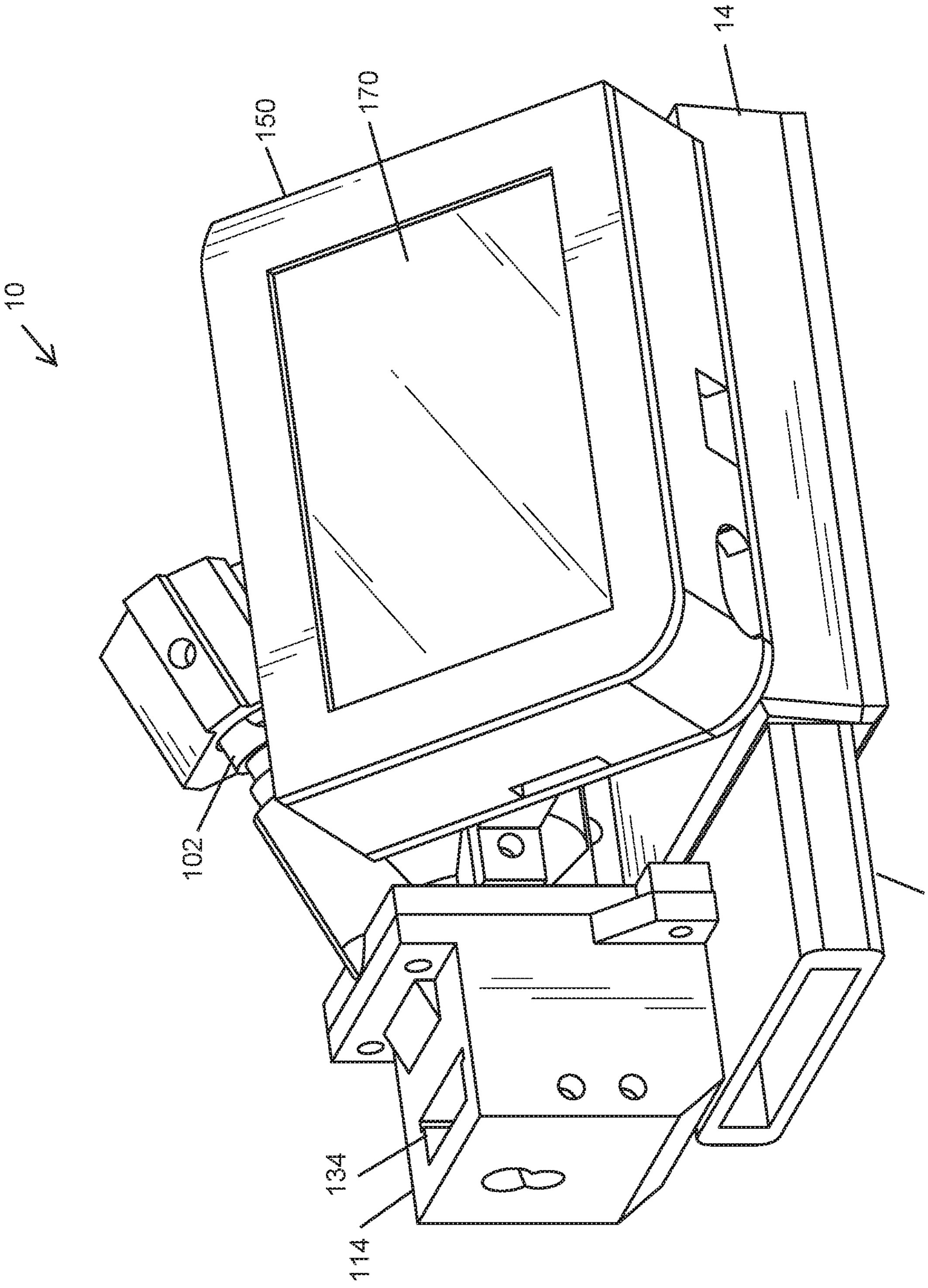
FIG. 1 is a front perspective view of an imaging device according to the present disclosure.
Figure 2:
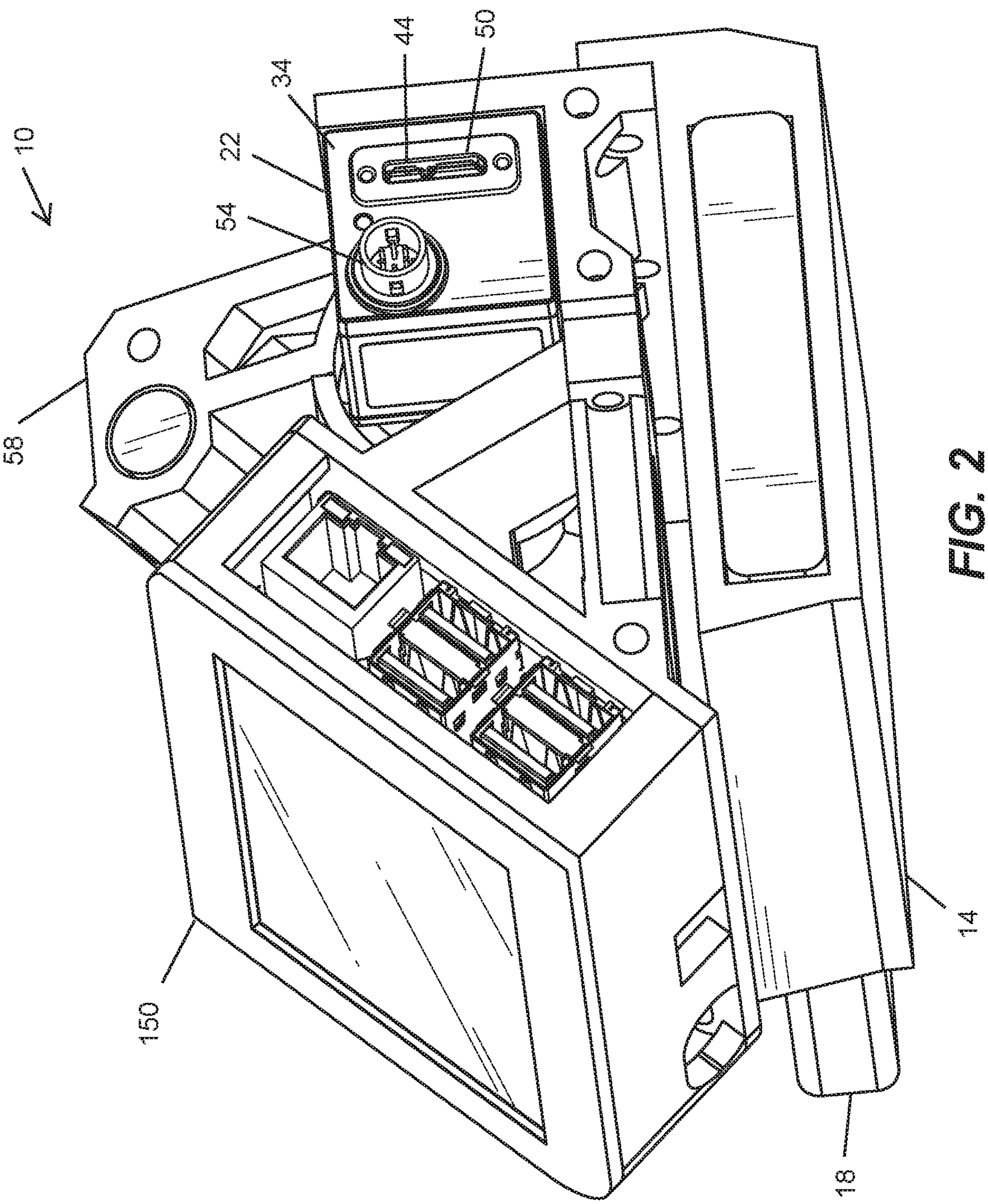
FIG. 2 is a side perspective view of the imaging device illustrated in FIG. 1.
Figure 3:
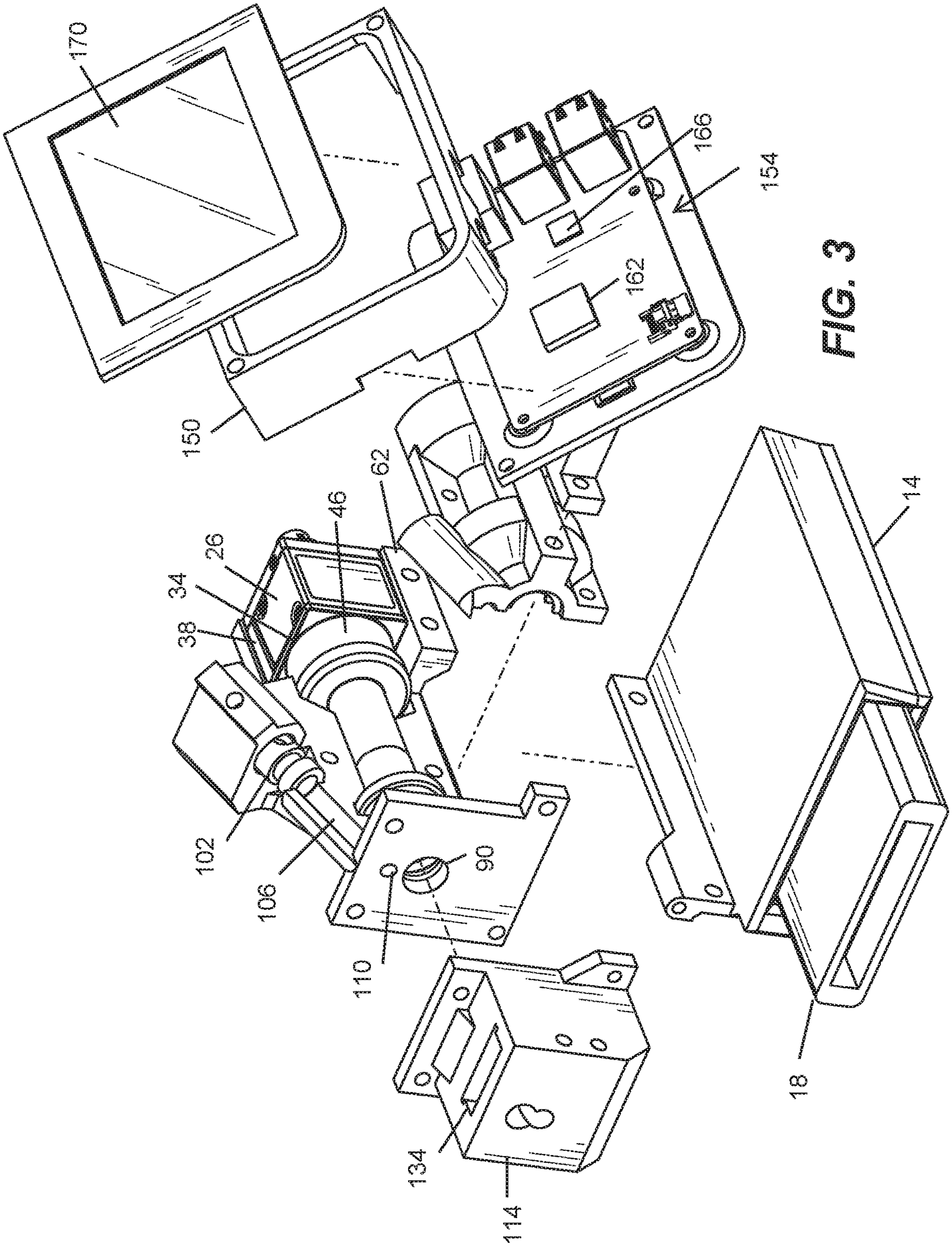
FIG. 3 is an exploded view of the imaging device illustrated in FIG. 1.
Figure 4:
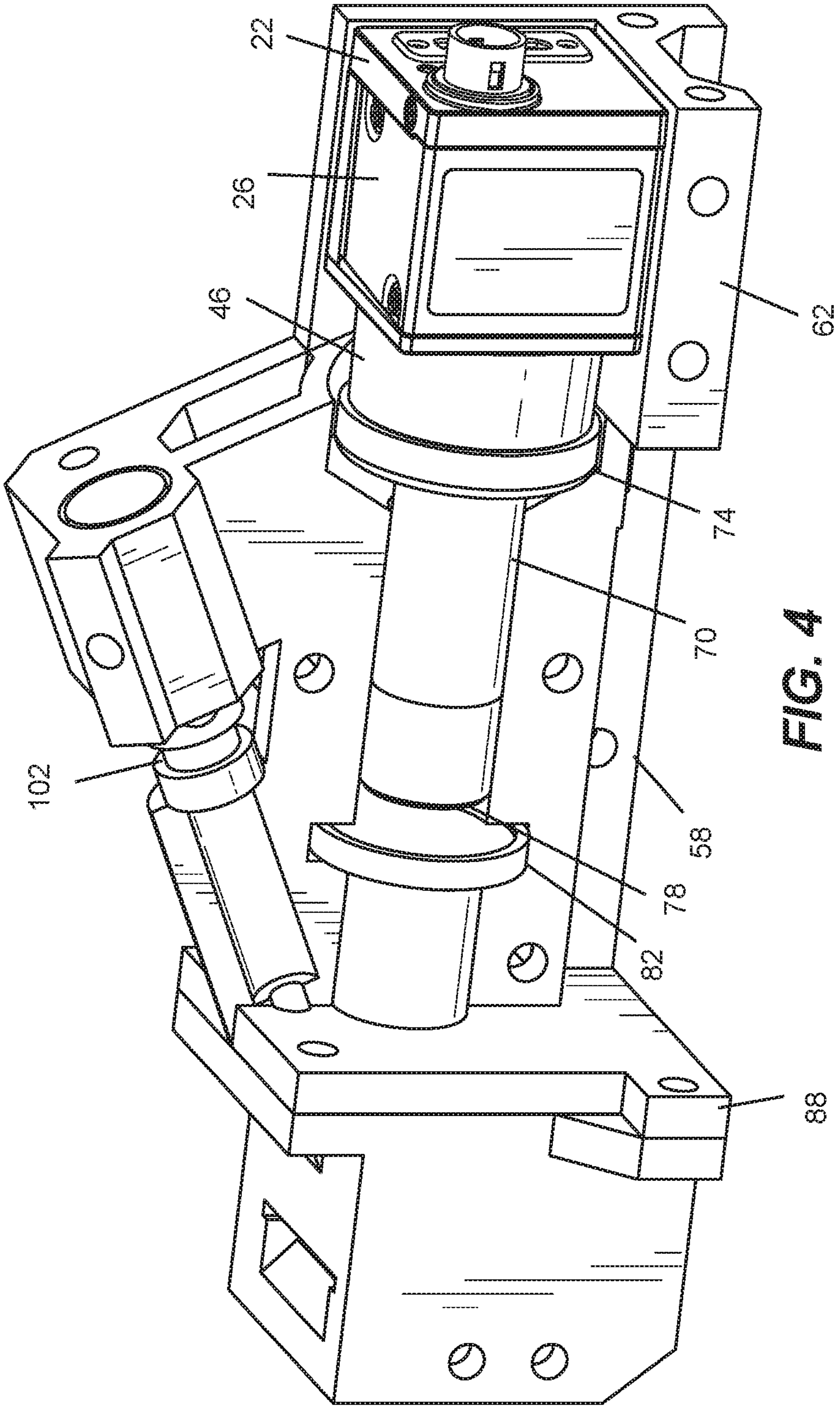
FIG. 4 is a cutaway view of the imaging device illustrated in FIG. 1.
Figure 5:
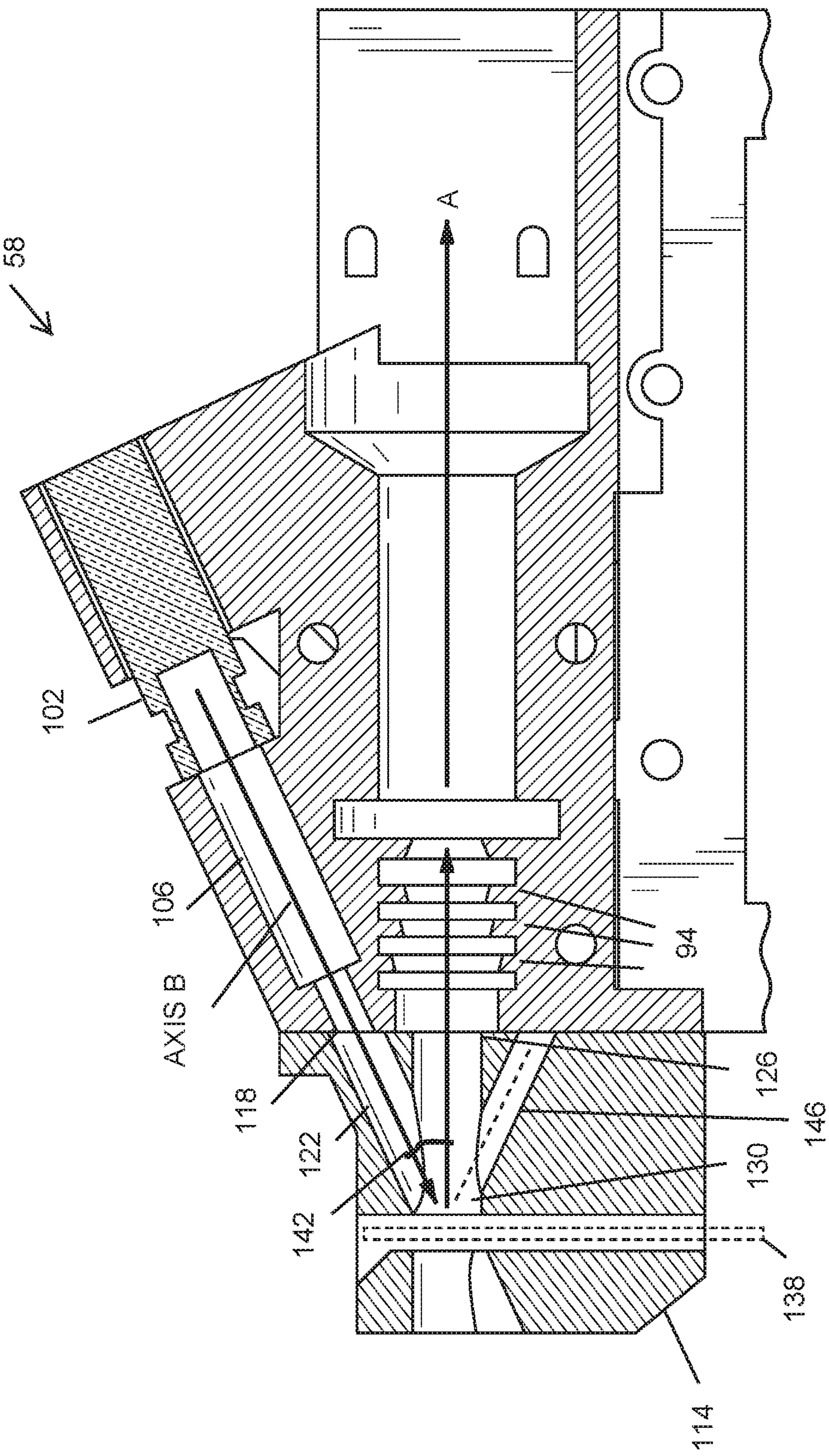
FIG. 5 is a cross-section view of the imaging device illustrated in FIG. 1.
Figure 6:
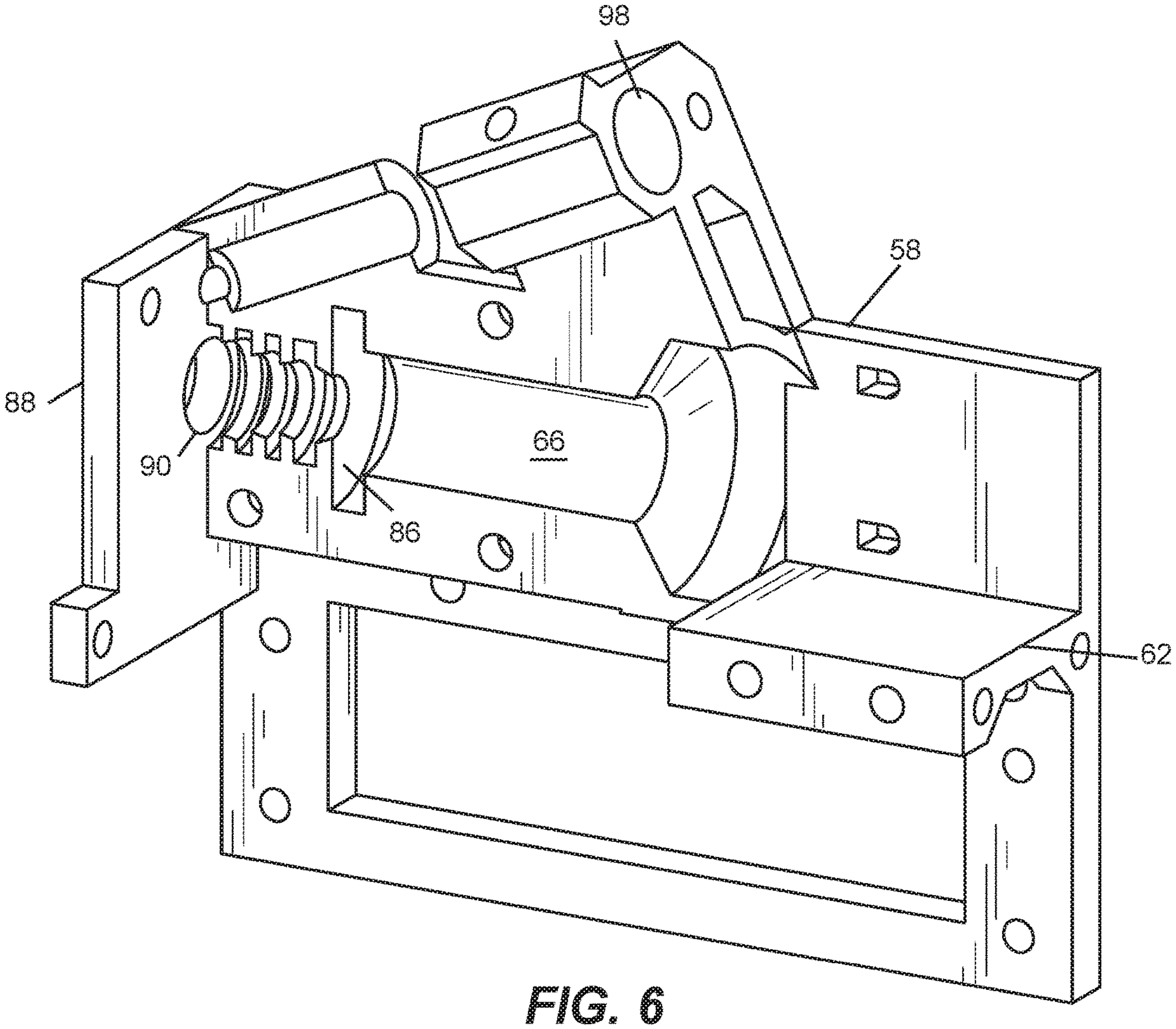
FIG. 6 is an enlarged perspective view of a portion of one housing of the imaging device illustrated in FIG. 1.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and may include electrical connections or couplings, whether direct or indirect. Also, electronic communications and notifications may be performed using any known means including wired connections, wireless connections, etc.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors configured in centralized or distributed fashions. In some instances, "control units" and "controllers" described in the specification can include one or more electronic processors, one or more memory modules including non-transitory computer-readable medium, one or more communication interfaces, one or more application specific integrated circuits (ASICs), and various connections (for example, a system bus) connecting the various components.

It should be understood that although certain drawings illustrate hardware and software located within particular devices, these depictions are for illustrative purposes only. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

For the specification of numeric ranges herein, each intervening number there between with the same degree of precision is explicitly contemplated. For example, for the range of 6-9, the numbers 7 and 8 are contemplated in addition to 6 and 9, and for the range 6.0-7.0, the numbers 6.0, 6.1, 6.2, 6.3, 6.4, 6.5, 6.6, 6.7, 6.8, 6.9, and 7.0 are explicitly contemplated.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The term "about" as used herein as applied to one or more values of interest, refers to a value that is similar to a stated reference value. In certain aspects, the term "about" refers to a range of values that fall within 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value).

As used herein, the term "biomarker" refers to a naturally occurring biological molecule present in a subject at varying concentrations that is useful in identifying and/or classifying a disease or a condition. The biomarker can include genes, proteins, polynucleotides, nucleic acids, ribonucleic acids, polypeptides, or other biological molecules used as an indicator or marker for disease. In some embodiments, the biomarker comprises a disease marker. For example, the biomarker can be a gene that is upregulated or downregulated in a subject that has a disease. As another example, the biomarker can be a polypeptide whose level is increased or decreased in a subject that has a disease or risk of developing a disease. In some embodiments, the biomarker comprises a small molecule. In some embodiments, the biomarker comprises a polypeptide.

"Sample" or "test sample" as used herein can mean any sample in which the presence and/or level of a target is to be detected or determined. Samples may include liquids, solutions, emulsions, or suspensions. Samples may include a medical sample. Samples may include any biological fluid or tissue, such as blood, whole blood, fractions of blood such as plasma and serum, muscle, interstitial fluid, sweat, saliva, urine, tears, synovial fluid, bone marrow, cerebrospinal fluid, nasal secretions, sputum, amniotic fluid, bronchoalveolar lavage fluid, gastric lavage, emesis, fecal matter, lung tissue, peripheral blood mononuclear cells, total white blood cells, lymph node cells, spleen cells, tonsil cells, cancer cells, tumor cells, bile, digestive fluid, skin, or combinations thereof. In some embodiments, the sample comprises an aliquot. In other embodiments, the sample comprises a biological fluid. Samples can be obtained by any means known in the art. The sample can be used directly as obtained from a patient or can be pre-treated, such as by filtration, distillation, extraction, concentration, centrifugation, inactivation of interfering components, addition of reagents, and the like, to modify the character of the sample in some manner as discussed herein or otherwise as is known in the art.

The term "sensitivity" as used herein refers to the number of true positives divided by the number of true positives plus the number of false negatives, where sensitivity ("sens") may be within the range of $0<sens<1$. Ideally, method embodiments herein have the number of false negatives equaling zero or close to equaling zero, so that no subject is wrongly identified as not having a disease when they indeed have the disease. Conversely, an assessment often is made of the ability of a prediction algorithm to classify negatives correctly, a complementary measurement to sensitivity.

The D4 rapid diagnostic assay was developed such that all reagents are "on-chip," stable without the need for cold-storage, and sensitive to protein biomarkers, such as but not limited to IL-6, TNFα, Leptin, and AFP, with existing matched antibody pairs within a drop of blood. The D4 rapid diagnostic assay is further described in U.S. Patent Application Publications Nos. 2019/0391141, 2019/0285623, 2018/0217136, and WO2017/015132 each of which is incorporated herein by reference. As noted above, current fluorescent microarray imaging detectors needed to readout the D4 assay are expensive, bulky, slow, and unable to be used at the POC. Accordingly, an imaging detector is described below that is low-cost, sufficiently sensitive, and POC capable of reading out the fluorescent D4 diagnostic assay.

FIGS. 1-6 illustrate an imaging detector 10 according to an embodiment of the present disclosure. The imaging detector 10 includes a first housing 14 configured to support a power source 18, such as a battery (e.g., rechargeable battery). The imaging detector 10 also includes a camera mount 22 configured to receive a camera 26 (e.g., Basler Ace camera with Sony IMX178 CMOS sensor). The mount 22 includes a first wall 30, a second wall 34 opposite the first wall 30, and a third wall 38 connecting the first wall 30 and the second wall 34. The first wall 30 includes an aperture 42 and a conduit 46 extending from the aperture 42. The second wall 34 includes a microB connector 44 that connects to an electronic processor (described below). The second wall 34 also includes at least one USB connector port 50 to transfer data from the camera 26 to an external computer or display. For example, the USB connector port(s) 50 can connect to a keyboard, mouse, or other computer peripheral. The second wall 34 also includes an Ethernet connector 54 for connection to the electronic processor (described below) for transferring data from the camera 26 to the electronic processor. The Ethernet connector 54 may be utilized if a Wi-Fi network is not available at the time of use of the device to transmit the data from the camera 26 to the electronic processor.

The imaging detector 10 also includes a second housing 58 coupled to the first housing 14. The second housing 58 includes a platform 62 configured to support the camera mount 22 (and the camera 26). The second housing 58 also includes a receptacle 66 configured to receive a lens 70 (e.g., MC100× lens) having a first end 74 coupled to the conduit 46 and a second end 78. The lens 70 is in optical communication with the camera 26. The receptacle 66 defines an axis A extending therethrough. The imaging detector 10 also includes an optical filter 82, such as a bandpass filter, positioned in a receptacle 86 of the second housing 58 adjacent to the second end 78 of the lens 70. The optical filter 82 passes only the wavelengths of fluorescent light emitted by the fluorophore and blocks all undesired light outside this band. By blocking unwanted excitation energy (including UV and IR) or sample and system autofluorescence, the optical filter 82 provides the darkest background. The optical filter 82 is interchangeable and depends on the fluorophore to be detected in the sample. For example, an emission bandpass filter may be selected depending on the fluorescent dye used on the sample and the fluorophores to be detected.

The second housing 58 also includes a support plate 88 oriented perpendicular to the axis A. The support plate 88 includes an aperture 90 having a diameter of between 8 mm and 12 mm. The second housing 58 also includes a plurality of baffles 94 positioned between the support plate 86 and the optical filter 82. The baffles 90 each include an aperture defining a diameter that decreases when moving along the axis A from the support plate 86 toward the optical filter 82.

The second housing 58 also includes a receptacle 98 configured to receive a laser assembly 102 (e.g., Thorlabs 635 nm red laser). The laser assembly 102 provides a laser beam configured to travel through a pathway 106 in the second housing 58 and through an aperture 110 in the support plate 86. The aperture 110 includes a diameter between about 4-8 mm and is positioned a distance of about 1-3 mm from the aperture 90. In one construction, the aperture 110 includes a diameter of about 6 mm. The pathway 106 defines an axis B.

The imaging detector 10 also includes a sample housing 114 coupled to the support plate 86. The sample housing 114 includes an aperture 118 and a pathway 122 aligned (along the axis B) with the (laser) aperture 110 and the pathway 106 in the support plate 86. The sample housing 114 also includes another aperture 126 and a pathway 130 aligned (along the axis A) with the (camera) aperture 90 in the support plate 86. The sample housing 114 also includes a slot 134 configured to receive a sample 138 (e.g., a D4 chip, cartridge, slide, etc.). The sample 138 may include one or more samples for testing. The sample 138 is positioned within the slot 134 such that the sample is transversely aligned with the axis A and axis B. Axis A and axis B are oriented transverse to each other. Axis A and axis B intersect at the sample 138 such that an angle 142 is formed between the two axes. In one construction, the angle 142 is less than 45 degrees. In another construction, the angle 142 is between 10 degrees and 45 degrees. In a further construction, the angle 142 is between 20 degrees and 35 degrees. In yet another construction, the angle 142 is 25 degrees.

The pathway 122 extends beyond the slot 134 and serves as a beamstop for any laser beam passing through the sample 138. The sample housing 114 includes another pathway 146 that serves as a beamstop for any laser beam reflected from the sample 138 at an angle greater than the angle 142 discussed above.

The imaging detector 10 also includes a third housing 150 coupled to the first housing 14. The third housing 150 supports an electronic device 154. The electronic device 154 includes, among other things, an electronic processor 162, such as, a programmable electronic microprocessor, microcontroller, or similar device (e.g., a Raspberry Pi 4), a memory 166 (for example, non-transitory, computer readable memory), and an input/output interface 170 (e.g., touchscreen display). The electronic processor 162 is communicatively connected to the memory 166 and the input/output interface 170. The electronic processor 162, in coordination with the memory 166 and the input/output interface 170, is configured to implement, among other things, the methods described herein.

As will be described in further detail below, the memory 166 includes computer executable instructions for automatically segmenting data, determining an average brightness of the detected data, and calculating a concentration value of the sample based on the brightness of the data.

In some embodiments, the electronic device 154 may be implemented in several independent controllers (for example, programmable electronic controllers) each configured to perform specific functions or sub-functions. Additionally, the electronic device 154 may contain sub-modules that include additional electronic processors, memory, or application specific integrated circuits (ASICs) for handling input/output functions, processing of signals, and application of the methods listed below. In other embodiments, the electronic device 154 includes additional, fewer, or different components. Thus, the functions performed by the methods herein may also be distributed among one or more processors and one or more memories. Additionally, the electronic device 154 may include a communications module allowing the electronic processor to communicate with a Wi-Fi network or other suitable network for transferring data to one or more remote computerized devices.

Figure 7:
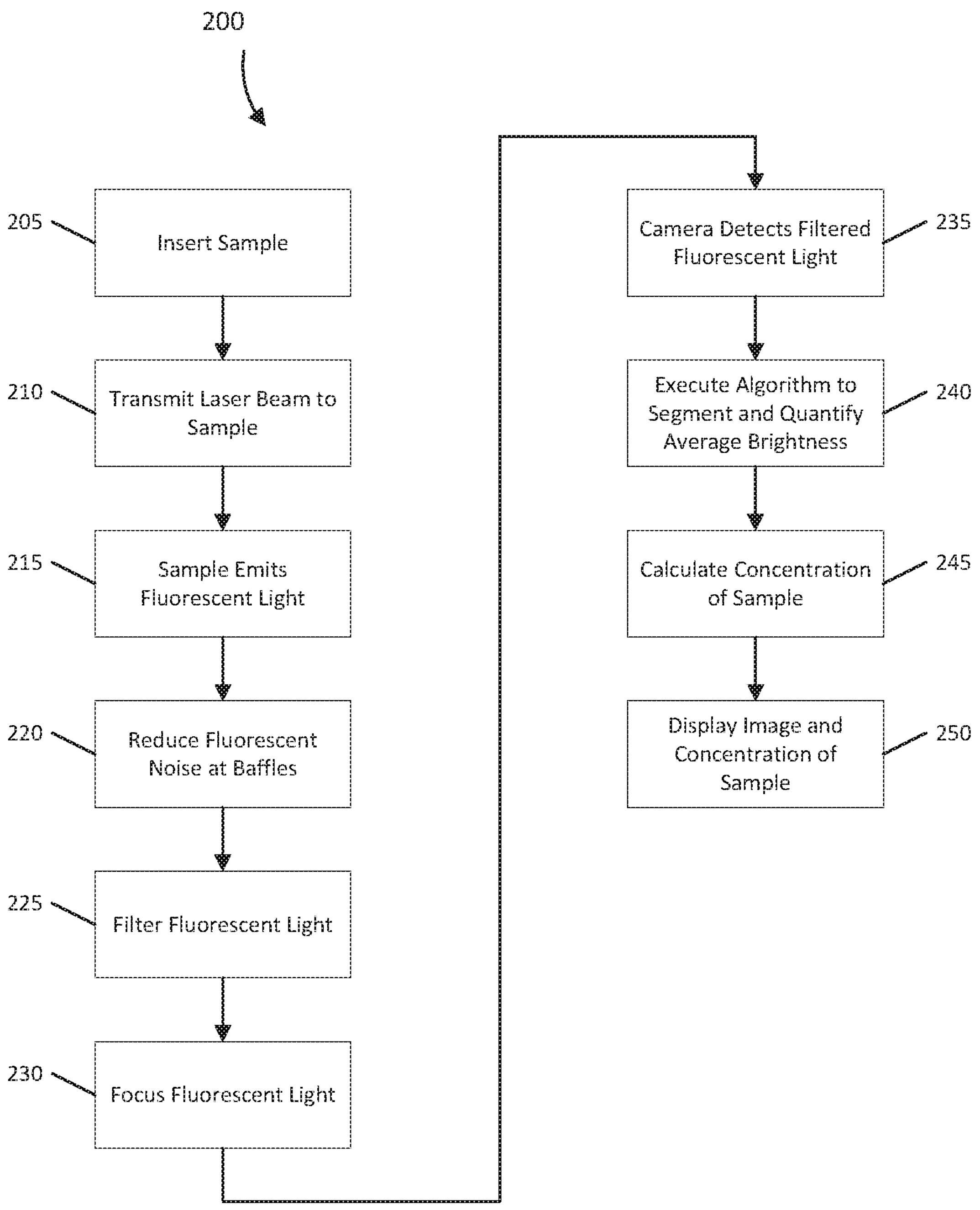
FIG. 7 is a flow chart illustrating a method of imaging and determining a concentration of one or more samples on a microarray chip according to an embodiment.
Figure 8:
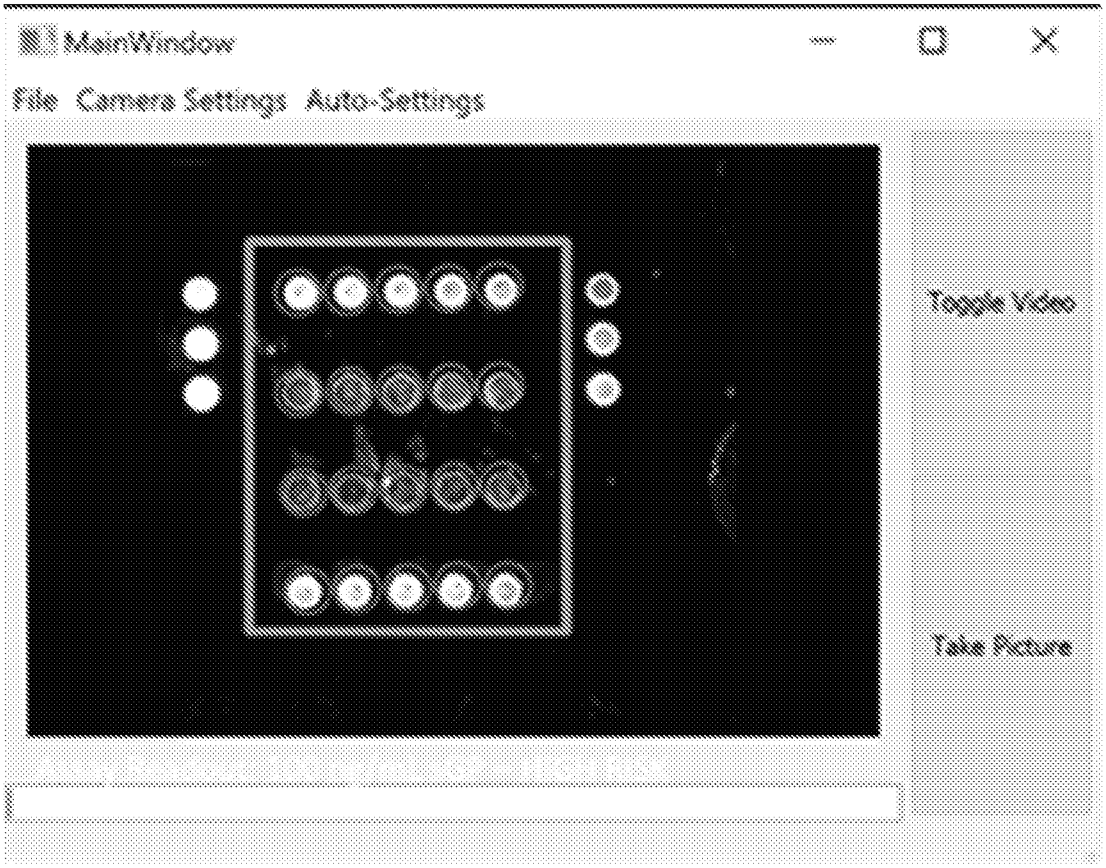
FIG. 8 is a screen graphic output on a display of the imaging device illustrated in FIG. 1.

FIG. 7 is a flow chart illustrating an example method 200 for imaging and determining a concentration of one or more samples on a microarray chip. The method begins at step 205 when the sample 138 is inserted into the slot 134 of the third housing 150. When the sample 138 is detected, the electronic processor 162 transmits a signal to the laser assembly 102 to generate a laser beam. The laser assembly transmits, at step 210, the laser beam toward the sample 138. The sample 138 contains fluorophores that react to the laser beam and emits fluorescent light at step 215. Both fluorescent light and non-fluorescent noise travel through the baffles 94, which entrap reflected/noise light reducing fluorescent noise captured at the camera sensor at step 220. The emitted fluorescent light continues toward the optical filter 82 where the fluorescent light is filtered, at step 225, in accordance with the desired pass-band wavelength and based on the biomarker(s) to be detected. The filtered fluorescent light continues into the lens 70 where the lens 70 focuses, at step 230, the fluorescent light onto the camera sensor 26. At step 235, the camera 26 detects the filtered fluorescent light for each sample on the sample 138 and produces an image (as illustrated in FIG. 8). The electronic processor 162 executes an algorithm stored in the memory 166, at step 240, to automatically segment bright spots against a dark background and to quantify an average brightness in each of the microspots within the image. The spot brightness directly correlates to biomarker concentration by a dose-response curve relationship. Based on the average brightness of each of the spots, the electronic processor 162 calculates the concentration of each sample at step 245. Lastly, the electronic processor 162 transmits instructions to the display to present, at step 250, the microarray image and the concentration of each sample.

Example

1. Prototype Testing

The performance and sensitivity of the protoype device to protein biomarkers was tested with generated dose response curves via spiked analyte samples. These samples were scanned by both the prototype and conventional benchtop scanner to evaluate limits of biomarker detection. For user-friendliness evaluation and further insight, researchers were trained to use the device and user-feedback helps guide future development. One such prototype was already deployed with a paired D4 POC test for Ebola virus at the Galveston National Laboratory's BSL4 lab in Texas, for testing with their Ebola infection model animals. The device was deployed and tested at Duke University with a paired D4 POC test for leptin.

Results and Discussion: The device showed a lower limit of detection than the conventional benchtop scanner for several biomarkers through internal testing. Further work was done to reduce costs, improve sensitivity, and improve user-friendliness on both hardware and software fronts. An additional brightfield imaging module can be implemented on the same device for traditional microscopy imaging, such that this device can capture valuable fluorescence and brightfield imaging and microarray data for training of machine learning algorithms for classification of disease and diagnosis.

Conclusions: As these promising results showed, the device can serve as the basis for future POC imaging. Together with the D4 microarray platform, the potential for democratization of protein microarray technology for use in the clinic and research has been demonstrated.

Figure 9A:
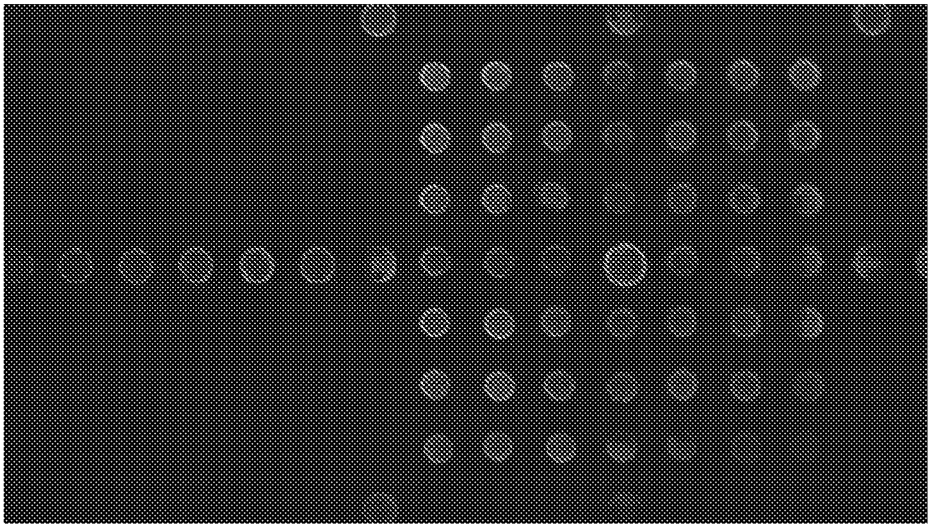
FIG. 9A is an image generated by an image detector with bright color housings.
Figure 9B:
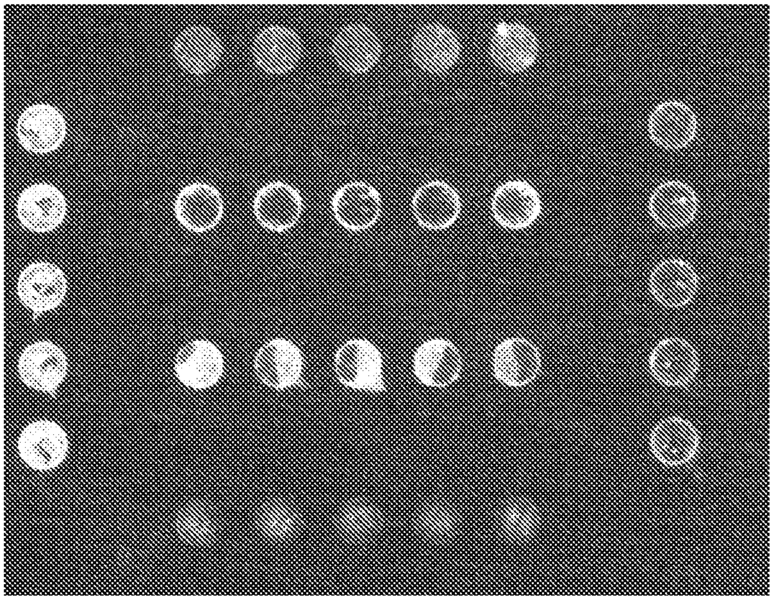
FIG. 9B is an image generated by an image detector with darker color housings.
Figure 9C:
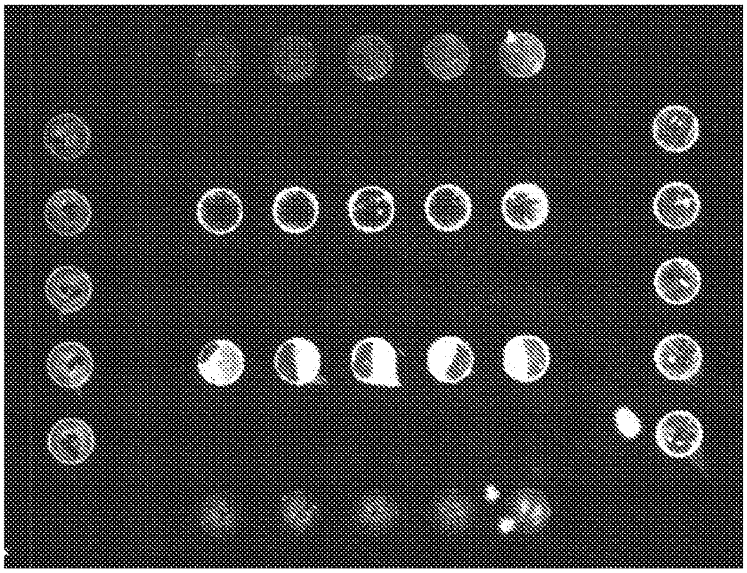
FIG. 9C is an image generated by an image detector with darker color housings and laser beamstops.
Figure 10:
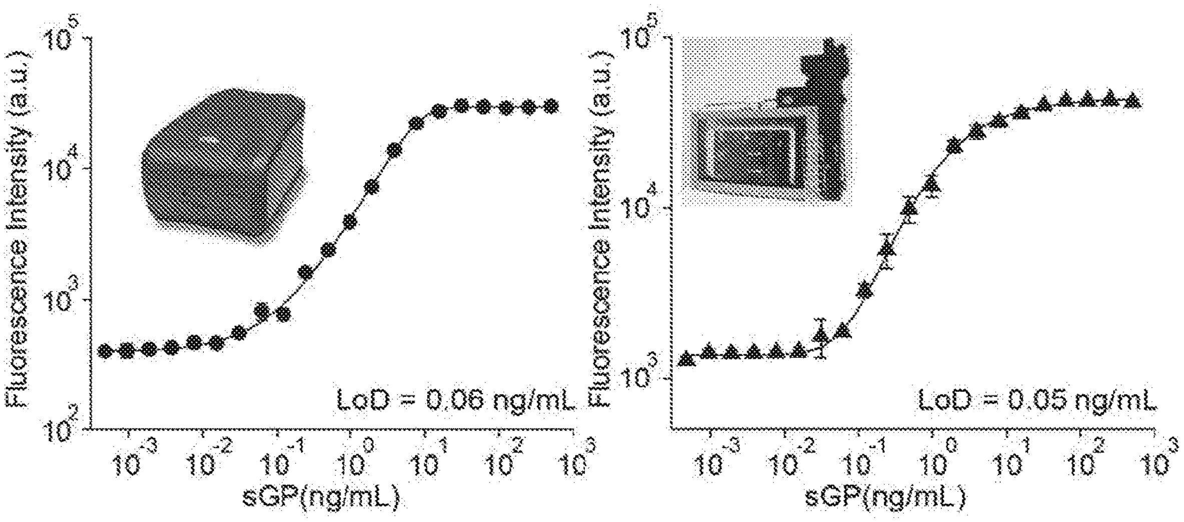
FIG. 10 is a graphical comparison of Zaire Ebolavirus dose response curves generated from spiked soluble glycoprotein in serum from scanning by a third party image detector and the image detector illustrated in FIG. 1 and show broad dynamic range (~4 logs) and equivalent limits of detection (~0.05 ng/mL)

The disclosed imaging detector demonstrated unexpected performance improvement over an existing microarray scanning device in the market, which employs complex instrumentation. The imaging detector disclosed herein is simpler, but yet performs better than the existing microarray scanning device. By 3D printing of the housings in black (or other relatively dark material) rather than in a bright color (such as a red or orange) had a surprising effect on the quality of the image generated by electronic processor. As illustrated in FIG. 9A, the image generated with the housings printed in the bright color was of poor quality. The spots should be very bright, but instead they are very dim. FIG. 9B illustrates an image generated with the housing printed in black. As shown in FIG. 9B, the spots are much brighter so there was a performance enhancement for sensitivity, but a higher noise background was present. The performance of the imaging detector was surprisingly further improved by adding the baffles and the beamstops to control the transmitted and reflected laser light. These features led to a surprisingly significant reduction in background noise in the image as shown in FIG. 9C with the bright spots against a dark background. More specifically, the features provided an average 20 times reduction in noise, which improved assay sensitivity by 20 times. The imaging device disclosed herein has been consistently able to match or beat sensitivity to biomarkers when compared to the existing microarray scanning device. FIG. 10 shows sensitivity performance, directly comparing a 100,000 USD fluorescent scanner that weighs 100 lbs to the 700 USD, 3 lb handheld imaging detector disclosed herein that can be used for point of care diagnostics (can be paired with any fluorescence-based assay, but validated with the D4 diagnostic assay). FIG. 10 illustrates Zaire Ebolavirus dose response curves generated from spiked soluble glycoprotein in serum from scanning by the larger and more expensive detector and the imaging detector disclosed herein show broad dynamic range (~4 logs) and equivalent limits of detection (~0.05 ng/mL). Additionally, the electronic processor described above operates more efficiently than prior devices to analyze and calculate concentration of the sample to provide the output within about 10 seconds after the sample is inserted into the detector. Prior devices typically take greater than 5-10 minutes to calculate concentration of a sample.

It is understood that the foregoing detailed description and accompanying examples are merely illustrative and are not to be taken as limitations upon the scope of the invention, which is defined solely by the appended claims and their equivalents. Various changes and modifications to the disclosed embodiments will be apparent to those skilled in the art.

What is claimed is:

1. A microarray chip imaging detector comprising:

a first housing including a slot configured to receive a microarray chip, the first housing including a first pathway having a first axis, and a second pathway having a second axis;

a second housing coupled to the first housing, the second housing includes a third pathway in optical communication with the first pathway of the first housing and aligned with the first axis, and a fourth pathway in optical communication with the second pathway of the first housing and aligned with the second axis, wherein the first axis is oriented at an acute angle relative to the second axis, wherein the acute angle is less than 45 degrees;

a power source coupled to the first housing and the second housing;

a laser assembly received within a first receptacle in the first housing, the laser assembly configured to transmit a beam to the microarray chip through the first pathway and the third pathway;

a lens received within a second receptacle in the second housing, the lens configured to receive and focus fluorescent light emitted from the microarray chip;

a camera supported by the second housing and configured to detect the focused fluorescent light from the lens;

an optical filter positioned upstream of the lens;

the second housing including a plurality of baffles positioned between the microarray chip and the optical filter; and a computer processor in electrical communication with the camera, the computer processor configured to receive data associated with the fluorescent light emitted from the fluorophores via the camera, generate a microarray image with the received data, automatically segment the microarray image with the received data, determine an average brightness of the data in at least one segment, calculate a concentration value based on the average brightness of the data in the segment, and transmit instructions to a display to present the concentration value of the segment.

2. The microarray chip imaging detector of claim 1, wherein the acute angle is less than 40 degrees.

3. The microarray chip imaging detector of claim 1, wherein the acute angle is 25 degrees.

4. The microarray chip imaging detector of claim 1, wherein the plurality of baffles each include an aperture.

5. The microarray chip imaging detector of claim 4, wherein the aperture in each baffle includes a diameter, and wherein the diameters decrease from the microarray chip to the optical filter.

6. The microarray chip imaging detector of claim 1, wherein the first housing includes a first laser beamstop positioned along the first axis.

7. The microarray chip imaging detector of claim 1, wherein the first housing includes a second laser beamstop positioned at an angle that is greater than the acute angle to receive the beam that reflects off the microarray chip.

8. The microarray chip imaging detector of claim 1, wherein the first housing and the second housing are 3D printed in a black material.

9. The microarray chip imaging detector of claim 1, wherein the concentration value is presented on the display within 10 seconds from insertion of the microarray chip into the first housing.

10. A microarray chip imaging detector comprising:

a housing configured to receive a microarray chip;

a laser assembly supported by the housing and oriented at an angle relative to the microarray chip, the laser assembly configured to transmit an excitation beam along a first axis to samples on the microarray chip;

a camera supported by the housing and positioned along a second axis, the camera configured to receive fluorescent light emitted from fluorophores in the samples on the microarray chip, the second axis oriented at an angle less than 30 degrees relative to the first axis; and the housing including a plurality of baffles positioned between the microarray chip and the camera, and a plurality of laser beamstops to receive the excitation beam reflected off the microarray chip, wherein the housing is 3D printed in a black material.

11. The microarray chip imaging detector of claim 10, wherein the plurality of baffles each include an aperture.

12. The microarray chip imaging detector of claim 11, wherein the aperture in each baffle includes a diameter, and wherein the diameters decrease from the microarray chip to the camera.

13. The microarray chip imaging detector of claim 10, wherein a first laser beamstop is positioned along the first axis.

14. The microarray chip imaging detector of claim 13, wherein a second laser beamstop is positioned at an angle greater than 30 degrees to receive the excitation beam that reflects off the microarray chip.

15. The microarray chip imaging detector of claim 10, further comprising a power source coupled to the housing.

16. A microarray chip imaging detector comprising:

a first housing including a slot configured to receive a microarray chip, the first housing including a first pathway having a first axis, and a second pathway having a second axis;

a second housing coupled to the first housing, the second housing includes a third pathway in optical communication with the first pathway of the first housing and aligned with the first axis, and a fourth pathway in optical communication with the second pathway of the first housing and aligned with the second axis, wherein the first axis is oriented at an acute angle relative to the second axis;

a power source coupled to the first housing and the second housing;

a laser assembly received within a first receptacle in the first housing, the laser assembly configured to transmit a beam to the microarray chip through the first pathway and the third pathway;

a lens received within a second receptacle in the second housing, the lens configured to receive and focus fluorescent light emitted from the microarray chip;

a camera supported by the second housing and configured to detect the focused fluorescent light from the lens;

an optical filter positioned upstream of the lens;

the second housing including a plurality of baffles positioned between the microarray chip and the optical filter, wherein the plurality of baffles each include an aperture and wherein the aperture in each baffle includes a diameter, and wherein the diameters decrease from the microarray chip to the optical filter; and a computer processor in electrical communication with the camera, the computer processor configured to receive data associated with the fluorescent light emitted from the fluorophores via the camera, generate a microarray image with the received data, automatically segment the microarray image with the received data, determine an average brightness of the data in at least one segment, calculate a concentration value based on the average brightness of the data in the segment, and transmit instructions to a display to present the concentration value of the segment.

* * * * *